United States Patent [19]

Lee et al.

[11] Patent Number: 4,539,342

[45] Date of Patent: Sep. 3, 1985

[54] POLYIMIDE FOAM PREPARED FROM AMINO TERMINATED BUTADIENE ACRYLONITRILE REACTANT

[75] Inventors: Raymond Lee, Elk Grove Village; David W. Okey, Downers Grove; Gregory A. Ferro, Mt. Prospect, all of Ill.

[73] Assignee: IMI-Tech Corporation, Elk Grove Village, Ill.

[21] Appl. No.: 596,298

[22] Filed: Apr. 3, 1984

[51] Int. Cl.³ .............................................. C08J 9/02
[52] U.S. Cl. .................................... 521/189; 521/180; 528/353
[58] Field of Search ....................... 521/189, 180, 154; 528/353, 26

[56] References Cited

U.S. PATENT DOCUMENTS 4,332,656  6/1982  Gagliani et al. .................... 521/180

OTHER PUBLICATIONS

St. Clair et al., Int. J. Adhesion and Adhesives, pp. 249-250, (Jul. 1981).

*Primary Examiner*—Lester L. Lee
*Attorney, Agent, or Firm*—McDougall, Hersh & Scott

[57] ABSTRACT

A polyimide and a process for its preparation wherein the polyimide is prepared from reaction of an organic tetracarboxylic acid or derivative thereof with a mixture of an aromatic diamine and an amine-terminated butadiene-nitrile copolymer. The polyimides of the invention are particularly useful in the preparation of flexible foams.

9 Claims, No Drawings

POLYIMIDE FOAM PREPARED FROM AMINO TERMINATED BUTADIENE ACRYLONITRILE REACTANT

This invention relates to new polyimides and more particularly to polyimide foams which are hydrolytically stable and possess a majority of cells which are closed resulting in improved vapor barrier properties.

It is known, as is described in U.S. Pat. Nos. 3,966,652 and 4,315,076, that polyimides can be produced which are hydrolytically stable and which have improved fire resistance properties, giving off essentially no smoke or toxic fumes when exposed to flame.

Foams of the type there described are useful in aircraft cabins, space vehicles, land and sea transport equipment, as well as other applications where relatively non-flammable and negligible smoke-emitting characteristics are desirable.

In the practice of the prior art as described above, such polyimide foams are prepared by reacting an alkyl diester of a tetracarboxylic acid with one or more aromatic and/or heterocyclic diamines. Typically, a tetracarboxylic dianhydride is reacted with methanol or ethanol to form the corresponding diester which is then reacted with the amine or amines to form the corresponding polyamide-acid/ester which can then be converted to a polyimide by further heating. As a general rule, a cellular structure is developed, because both water and a lower alkyl alcohol corresponding to the alcohol portion of the ester is generated in situ during the reaction. These volatile materials produce open cell polyimide foams which are flexible and resilient and have fine, homogeneous cellular structure.

While amines of the type described above represent a significant advance in the art, their properties when used in insulation in applications involving high humidity are not as great as might be desired. Specifically, foams produced in accordance with the foregoing concepts possess an open cellular structure and therefore do not have significantly high vapor-barrier qualities to facilitate their use in, for example, fire-resistant, anti-sweat submarine hull insulation.

It is known, as described by St. Clair et al. in *Int. J. Adhesion and Adhesives,* 249–50 (July, 1981), that adhesives can be prepared by reaction of tetracarboxylic acid dianhydride with amine-terminated butadiene acrylonitrile to produce polyimide adhesives. Because of the viscosity and molecular weight of such amine-terminated butadiene-acrylonitrile copolymers, such amines are not capable of reaction with tetracarboxylic acid dianhydrides to provide flexible, resilient closed cell foams.

It is accordingly an object of the present invention to provide polyimides which are capable of being foamed and which can be used in applications in high humidity to provide vapor-barrier qualities.

It is a more specific object of the invention to provide a polyimide foam and a process for the preparation of the same to produce polyimide foams having fine homogeneous closed cellular structure which are flexible, resilient, and which can provide significantly improved vapor-barrier characteristics.

The concepts of the present invention reside in a polyimide foam and a process for its preparation in which the polyimide is prepared by reaction of an organic tetracarboxylic acid or corresponding anhydride or ester derivative thereof with a combination of diamines including at least one aromatic diamine and an amine-terminated butadiene nitrile copolymer. It has been found that diamines of the type described will provide foams which have a good closed cellular structure, which are flexible and resilient even at low temperatures and which provide high vapor-barrier characteristics.

In the practice of the invention, the amine-terminated butadiene-nitrile copolymer has the general formula:

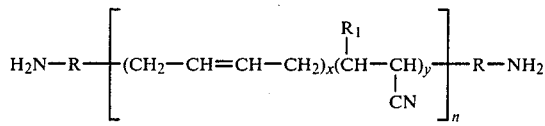

wherein R is either a phenylene group or an alkylene group, $R_1$ is hydrogen or methyl, and x and y are each independently integers ranging from 1 to 25 and n is an integer, preferably below 20.

In the preferred practice of this embodiment of this invention, the amine-terminated butadiene-nitrile copolymer is a butadiene-nitrile rubber wherein butadiene constitutes at least 50 percent by weight of the total of the butadiene and nitrile. The nitrile monomer copolymerized with the butadiene can either be acrylonitrile or methacrylonitrile and the polymerization reaction can be carried out in accordance with conventional free radical polymerization techniques. The copolymer produced is a random copolymer containing both butadiene and acrylonitrile or methacrylonitrile in the polymer backbone. The amine functionality is introduced by end-capping of the copolymer with, for example, para-aminostyrene or allylamine in accordance with conventional techniques.

As a general rule, the amine-terminated butadiene-nitrile copolymer employed in the practice of the present invention has a low molecular weight, preferably less than 3000 to ensure that it is sufficiently fluid to react in the formation of the polyimide as well as sufficiently fluid so as to be capable of foaming.

In the preferred practice of the invention, the organic tetracarboxylic acid in the form of its diester from methanol or ethanol is reacted with one of the foregoing diamines, either alone or in combination with other amines to form a polyamide-acid/ester prepolymer which can then be foamed and cured, either alone or in the presence of a blowing agent, to provide the desired polyimide foam.

The tetracarboxylic acids or derivatives thereof preferably employed in the practice of the invention are those having the general formula:

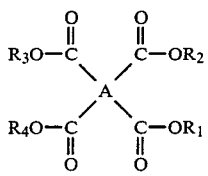

wherein A is a tetravalent organic group and $R_1$ to $R_4$, inclusive, are each selected from the group consisting of hydrogen and lower alky, and preferably methyl, ethyl or propyl. The tetravalent organic group A is preferably one having one of the following structures:

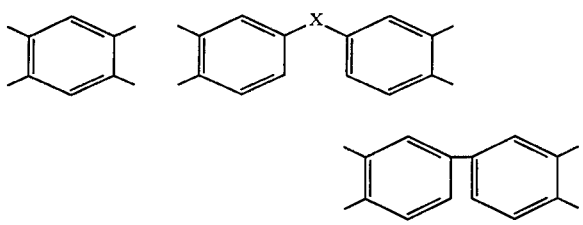

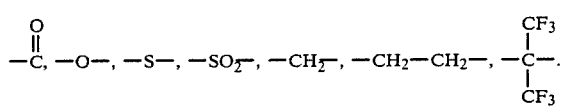

wherein X is one or more of the following:

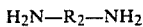

Preferred among the tetracarboxylic acid and derivatives thereof is 3,3′,4,4′-benzophenone tetracarboxylic acid and its corresponding lower alkyl (preferably lower dialkyl) esters.

As the organic diamine, use is preferably made of one or more aromatic and/or heterocyclic diamines which are themselves known to the art. Such aromatic diamines can be represented by the structure:

$H_2N-R_2-NH_2$ wherein $R_2$ is an aromatic diamine containing 5 to 16 carbon atoms and containing up to 1 hetero atom in the ring, the hetero atom being selected from the group consisting of —N—, —O— and —S—. Also included herein are those $R_2$ groups wherein $R_2$ is a diphenyl group or a diphenylmethane group. Representatives of such diamines include:
2,6-diaminopyridine
3,5-diaminopyridine
3,3′-diaminodiphenyl sulfone
4,4′-diaminodiphenyl sulfone
4,4′-diaminodiphenyl sulfide
3,3′-diaminodiphenyl ether
4,4′-diaminodiphenyl ether
meta-phenylene diamine
para-phenylene diamine
p,p′-methylene dianiline
2,6-diamino toluene
2,4-diamino toluene It is also possible, and sometimes desirable in the preparation of the polyamide-acid/ester prepolymer, to include in the reaction mixture one or more aliphatic diamines. Such aliphatic diamines are preferably alpha-omega diaminoalkanes having the general formula:

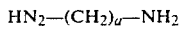

wherein a is an integer from 2 to 16. Representative of such diamines include 1,3-diaminopropane, 1,4-diaminobutane, 1,5-diaminopentane, 1,6-diaminohexane, etc.

In place of the foregoing aliphatic amines, use can also be made of the polyamines marketed by Texaco Chemical Company under the trademark JEFFAMINE. Those amines can be described as polyoxypropylene amines, and have the formula:

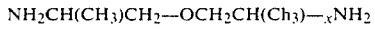

wherein x varies from 1 to about 5.

The relative proportions used in the preparation of the prepolymer are not critical and can be varied to relatively wide limits. In general, it is preferred to employ between 0.5 to 1.5 moles of amine per mole of the tetracarboxylic acid dianhydride or ester derivative thereof. The aromatic amine generally constitutes from 92.5 to 99.95 mole % based on the number of moles of the tetracarboxylic acid or derivative, while the proportion of the amine-terminated butadiene-nitrile copolymer constitutes 0.05 to 7.5 mole % based on the total moles of tetracarboxylic acid or derivative thereof.

It is also possible, and sometimes preferred, to employ a combination of aromatic amines, as described above, which is carbocyclic with an N-heterocyclic amine of the sort described above in addition to the amine-terminated butadiene-nitrile copolymer.

It is also possible to employ, as a fourth amine component, the aliphatic amine described above. When the aliphatic amine is employed, it is generally used in an amount ranging from 1 to 40 percent based on the total moles of the acid anhydride or ester employed.

In the preparation of the prepolymer, the tetracarboxylic acid dianhydride derivative, usually in the form of the diester, is reacted with the diamine or diamines at a temperature below the reflux temperature of the reaction mixture. Without limiting the invention as to theory, it is believed that the prepolymer is formed of a low-molecular weight polyamide-acid/ester which can then be heated to complete the polymerization reaction. The prepolymer can thus be in the form of a liquid or a solid having a low-molecular weight, so long as it is capable of being converted by further reaction to a high-molecular weight polyimide polymer.

When using a lower alkyl ester of the tetracarboxylic acid, the resulting alcohol produced in the reaction as well as the water released during the reaction can be used as the blowing agent during polymerization to form the desired polyimide foams. Alternatively, use can be made of any of a variety of blowing agents, such as the solid blowing agents described in co-pending application Ser. No. 532,663, filed Sept. 16, 1983, the disclosure of which is incorporated herein by reference.

As there described, the homogeneity of the cellular structure of the resulting polyimide foam can be more accurately controlled by controlling the particle size of the solid blowing agent, when such a blowing agent is employed. It has been found that the particle size of the solid blowing agent is preferably less than 200 microns in diameter, with 98 percent of the blowing agent particle sizes being less than 150 microns in diameter.

In the practice of the invention, it is possible to include in the reaction mixture various filler and/or reinforcing materials. For example, graphite, glass and other synthetic fibers can be added to the composition to produce a fiber-reinforced product. It is frequently desirable to employ a surfactant, thereby increasing its bubble stability and the uniformity in its cellular structure, to increase fatigue resistance and to make the foam more flexible and resilient. Such surfactants are themselves conventional, and form no part of the present invention.

The temperatures at which the prepolymer is converted to the polyimide polymer are generally those temperatures used in the preparation of other polyimide polymers. As a general rule, temperatures ranging from 200° to 400° C. can be used, with heating times ranging from 5 to 60 minutes or longer. As those skilled in the art will appreciate, the time for carrying out the reaction is somewhat dependent on the reaction temperature, higher temperatures enabling the use of shorter reaction times. It is also possible to heat to a lower temperature in the first stage of the reaction and then higher temperatures in the later stages.

Heating can be carried out in a conventional oven if desired. Alternatively, the foaming and curing of the prepolymer into a polyimide polymer can be effected by means of microwave heating. It has been found that the prepolymer can be converted to the corresponding polyimide foam by exposing the prepolymer for 1 to 120 minutes to radio frequencies within the range 915 to 2450 mHz, with the power output ranging from 1 to 100 kw. The power output to prepolymer weight ratio generally reads from about 0.1 to 10 kw per kg.

Having described the basic concepts of the invention, reference is now made to the following examples which are provided by way of illustration, but not by way of limitation, of the practice of the invention.

Example

This example illustrates the practice of the present invention in the use of the amine-terminated butadiene-acrylonitrile copolymer.

A reaction mixture is formulated of 3,3′4,4′-benzophenone tetracarboxylic acid dimethyl ester (BTDA), 2,6-diaminopyridine (DAP), p,p′-methylene dianiline (MDA) and an amine-terminated butadiene-acrylonitrile copolymer (ATBN) in molar % concentrations of 1, 2, 5, 7.5 and 10 based on the number of moles of the BTDA. The proportions of each mixture are shown below:

| SAMPLE | BTDA | DAP | MDA | ATBN |
|--------|------|-----|------|-------|
| A | 1.0 | 0.3 | 0.69 | 0.01 |
| B | 1.0 | 0.3 | 0.68 | 0.02 |
| C | 1.0 | 0.3 | 0.65 | 0.05 |
| D | 1.0 | 0.3 | 0.625 | 0.075 |
| E | 1.0 | 0.3 | 0.60 | 0.10 |

The resulting reaction mixtures are then heated to 60° C. for 180 minutes to produce a solid prepolymer.

Thereafter, the prepolymer is heated at 300° C. to form a series of foam polyimides. All but the polyimide containing 10% ATBN produced flexible foams having fine cell size. The 10% foam was a rigid foam.

It will be understood that various changes and modifications can be made in the details of procedure, formulation and use without departing from the spirit of the invention, especially as defined in the following claims.

We claim:

1. A polyimide foam prepared from a polyamide-acid/ester prepolymer synthesized by reaction of an organic tetracarboxylic acid ester derivative with (a) 0.05 to 7.5 mole % of at least one liquid diamine selected from the group consisting of a polymer having the formula:

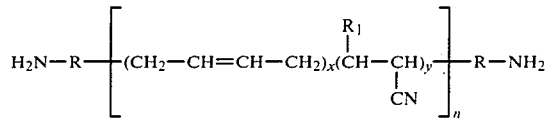

wherein R is either a phenylene group or an alkylene group, $R_1$ is hydrogen or methyl, n is an integer preferably below 20 and x and y are each independent integers ranging from 1 to 25 and (b) an aromatic diamine having the formula:

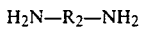

wherein $R_2$ is an aromatic group containing 5 to 16 carbon atoms.

2. A polyimide foam as defined in claim 1 wherein the tetracarboxylic acid derivative is a compound having the formula:

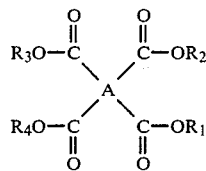

wherein A is a tetravalent organic group and $R_1$ to $R_4$ are each selected from the group consisting of hydrogen and lower alkyl.

3. A polyimide foam as defined in claim 1 wherein the aromatic diamine is methylene dianiline.

4. A polyimide foam as defined in claim 1 which includes at least one aromatic and at least one heterocyclic diamine.

5. A polyimide foam as defined in claim 1 which includes at least one aliphatic diamine.

6. A process for the preparation of a polyimide foam comprising reacting an organic tetracarboxylic acid ester with (a) 0.05 to 7.5 mole % of at least one liquid diamine selected from the group consisting of a polymer having the formula:

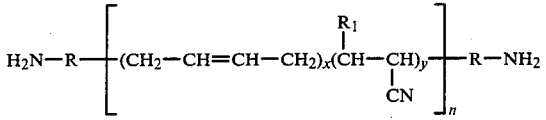

wherein R is either a phenylene group or an alkylene group, $R_1$ is hydrogen or methyl, n is an integer preferably below 20 and x and y are each independent integers ranging from 1 to 25 and (b) an aromatic diamine having the formula:

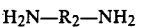

wherein $R_2$ is an aromatic group containing 5 to 16 carbon atoms, and heating the resulting mixture to polymerize the mixture and convert it to a foam.

7. A polyimide foam as defined in claim 1 wherein the organic tetracarboxylic acid/ester is a di(loweralkyl)ester of benzophenone tetracarboxylic acid.

8. A polyimide foam as defined in claim 1 wherein the liquid diamine is an amine-terminated copolymer of butadiene and acrylonitrile.

9. A process as defined in claim 6 which includes a blowing agent to convert the polymer to a foam.

* * * * *